US006698775B2

United States Patent
Ness

(10) Patent No.: US 6,698,775 B2
(45) Date of Patent: Mar. 2, 2004

(54) FOUR-LINK VEHICLE SUSPENSION SYSTEM

(76) Inventor: Donald S. Ness, 10590 Radisson Rd., NE., Minneapolis, MN (US) 55449

( * ) Notice: Subject to any disclaimer, the term of this patent is extended or adjusted under 35 U.S.C. 154(b) by 0 days.

(21) Appl. No.: 09/951,792

(22) Filed: Sep. 13, 2001

(65) Prior Publication Data

US 2002/0067016 A1 Jun. 6, 2002

Related U.S. Application Data

(60) Provisional application No. 60/232,264, filed on Sep. 14, 2000.

(51) Int. Cl.$^7$ ................................................ B60G 7/02
(52) U.S. Cl. ........... 280/86.757; 280/788; 280/124.116; 248/125.3; 248/274.1; 403/3
(58) Field of Search ........................ 280/86.75, 86.751, 280/86.757, 788, 124.116, 124.128; 248/125.3, 125.1, 122.1, 274.1; 403/3, 4

(56) References Cited

U.S. PATENT DOCUMENTS

| 2,122,961 | A | * | 7/1938 | Siebler | .................... 280/86.75 |
|---|---|---|---|---|---|
| 2,674,465 | A | * | 4/1954 | Carpezzi | ................. 280/86.757 |
| 3,960,391 | A | * | 6/1976 | Vetter et al. | ................. 280/203 |
| 4,266,799 | A | * | 5/1981 | Wood | ........................ 280/490.1 |
| 4,310,171 | A | * | 1/1982 | Merkle | .................... 280/86.75 |
| 4,422,666 | A | * | 12/1983 | Proctor | ................... 280/86.757 |
| 5,803,200 | A | * | 9/1998 | Brandt | ................. 280/124.116 |
| 5,823,548 | A | * | 10/1998 | Reiland et al. | ......... 280/33.993 |

* cited by examiner

*Primary Examiner*—Peter C. English
(74) *Attorney, Agent, or Firm*—Artz & Artz

(57) ABSTRACT

A four-link suspension system provides an almost infinite amount of adjustments to compensate for changing weather and road conditions. The suspension system includes a main support bracket with a plurality of holes formed therein and a plurality of links attached thereto. Each of the plurality of links has a plurality of holes formed therein for engaging a respective one of the plurality of holes formed in the main support bracket. The particular placement and combination of the holes in the main support bracket and each link, the size of each hole and slot, the shape of each link, the shape of the main support bracket, and the engagement of the links to the main support bracket permit the four-link suspension system to have hundreds of possible instant center (I/C) choices and locations. The assortment of configurations available allow the user to have an ideal four-link suspension system for any particular application.

17 Claims, 4 Drawing Sheets

FOUR-LINK VEHICLE SUSPENSION SYSTEM

CROSS-REFERENCE TO RELATED APPLICATIONS

The present application claims priority from Applicant's co-pending U.S. provisional application, Serial No. 60/232,264, filed Sep. 14, 2000.

TECHNICAL FIELD

The present invention relates generally to a rear suspension system, and more particularly to an adjustable four-link suspension system for a high performance vehicle.

BACKGROUND OF THE INVENTION

There are many types of suspension systems that are currently being utilized in the automotive industry, and specifically in the racing industry. Among these are ladder bar, torque arm, swing arm, three-link, and four-link suspension systems. Presently, four-link suspension systems are preferred for a variety of reasons. First, four-link suspension systems are compact in size. While typical ladder bars are about 34–36 inches in length, typical four-links are about 22 inches long. Four-link suspension systems provide a vehicle manufacturer with additional floor space, which allows the driver to sit further rearward in the vehicle with respect to the front end of the vehicle and thus, under the main roll cage area. Locating a driver further rearward allows more weight to be distributed towards the rear of the vehicle and thus, over the rear wheels. This also allows the driver to be more comfortable and gives the rear wheels of the vehicle more traction. Additionally, four-link designs make it easier to distribute loads to the rest of the chassis structure.

Current four-link systems also provide advantages over other known suspension systems because they provide a greater number of instant/center (I/C) choices than other suspension systems. The I/C or instant center is an imaginary point, determined as the center of a radius made by a moving suspension that is the point of lift (positive or negative). Moreover, current four-link suspension systems are also advantageous because they provide a wide range of possible location choices. These four-link systems further allow easy pinion angle changes, easy alignment of the rear to the centerline of a vehicle, and easy preload adjustments.

However, while advantageous over prior suspension systems, existing four-link suspension systems suffer from a variety of problems. For example, current four-link systems are delicate to tune and sensitive to adjust. Moreover, current four-link suspension systems have only a discrete number of adjustments to compensate for changes in track and weather conditions. The adjustment process for these four-link suspension systems is also relatively time consuming and can take up to 15 to 20 minutes, thereby possibly preventing necessary on-the-fly adjustments. This is because when adjustments were made, the configuration has to be changed. Additionally, the proper adjustment can only be determined through experimentation. It would therefore be desirable to provide a four-link suspension system that can be quickly and easily adjusted and also provides significantly more adjustment options.

SUMMARY OF THE INVENTION

It is therefore an object of the present invention to provide a four-link suspension system with significantly increased flexibility to allow a configuration that meets the requirements of a particular environment.

It is a related object of the present invention to provide a four-link suspension system that is almost infinitely adjustable.

It is a further object of the present invention to provide a four-link suspension system for a high performance vehicle, such as a race car, that provides increased rear wheel traction.

It is still another object of the present invention to provides a four-link suspension system that is lighter and stronger than prior designs.

It is yet another object of its the present invention to provide a four-link suspension system that can be adjusted without effecting pinion angle, pre-load, or wheel base change.

In accordance with the above and the other objects of the present invention, a four-link suspension system for a high performance vehicle is provided. The suspension system includes a main support bracket having a first side and a second side opposing the first side. The main support bracket has a first series of holes formed through the main support bracket and opening on each of the first and second sides. The main support bracket has a first link engageable with the first side and a second link engageable with the second side. The first link has one or more holes formed therethrough that are alignable with the first series of holes in the main support bracket. The second link has one or more holes formed therethrough that are also alignable with the first series of holes. Each of the first link and the second link have a first side and a second side. The holes formed in each of the links are alignable with the first series of holes in the main support bracket, when either the first side or the second side of either link engages the main support bracket.

The present invention itself, together with further objects and attendant advantages, will be best understood by reference to the following detailed description, taken in conjunction with the accompanying drawings.

DETAILED DESCRIPTION OF THE PREFERRED EMBODIMENTS

Figure 1:
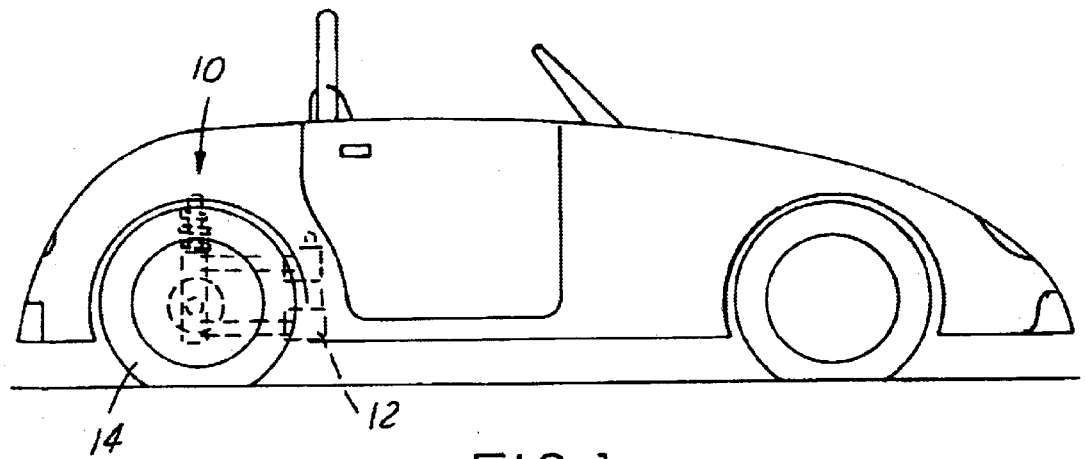
FIG. 1 is a schematic view of a rear portion of a vehicle having a four-link suspension system in accordance with a preferred embodiment of the present invention.

Referring now to FIG. 1, which illustrates a perspective view of an automotive vehicle 10 having a four-link suspension system 12 in accordance with the present invention. The four-link suspension system 12 is intended to be utilized to support a vehicle wheel 14 and effectuate a variety of adjustments, including pinion angle changes, alignment of the vehicle rear to the centerline of the car, and pre-load. As is known, the pinion angle is the difference between the centerline of the pinion and the centerline of the driveshaft. As is also known, pre-load is a method of loading a spring or suspension system while the spring is in static condition. The system 12 is preferably utilized with the rear wheels of a vehicle, but may alternatively be utilized with the front wheels.

Figure 2:
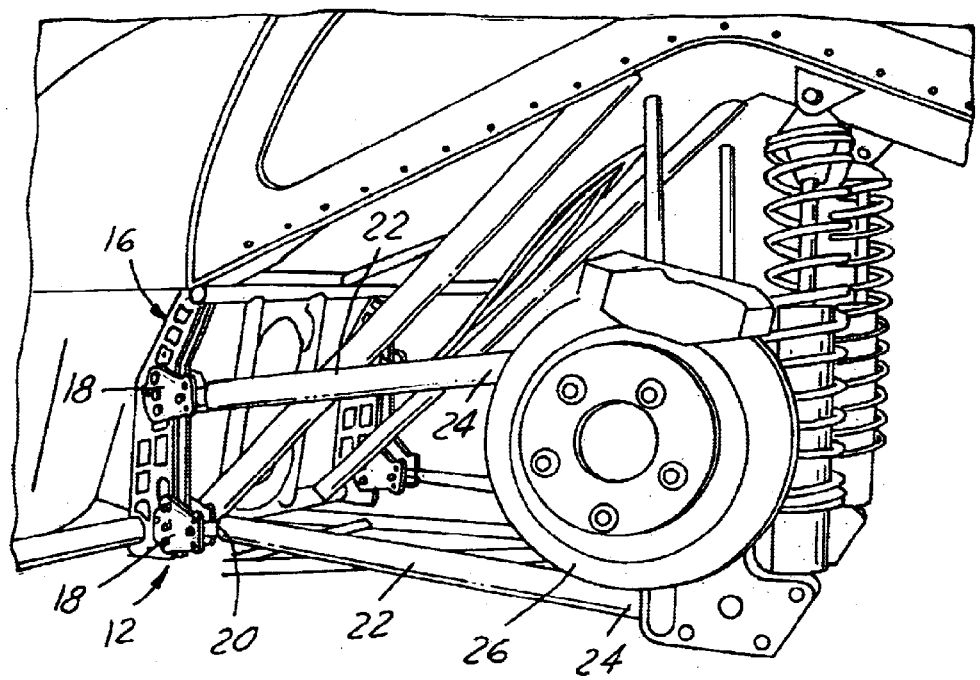
FIG. 2 is a schematic perspective view of a four-link suspension system in accordance with a preferred embodiment of the present invention.

The four-link suspension system 12 is illustrated with more specificity in FIG. 2. As shown, the four-link suspension system 12 preferably includes a main support bracket 16 and a plurality of individual links 18. Each of the plurality of links 18 is preferably attached to one end 20 of a respective tie rod 22. The tie rods 22 are each attached at their other ends 24 to a hub assembly 26. The suspension system 12 is preferably utilized as a rear suspension system in a high performance vehicle such as a racecar or a drag-race car. However, it will be understood that suspension system 12 may be utilized in a variety of other applications.

Figure 3:
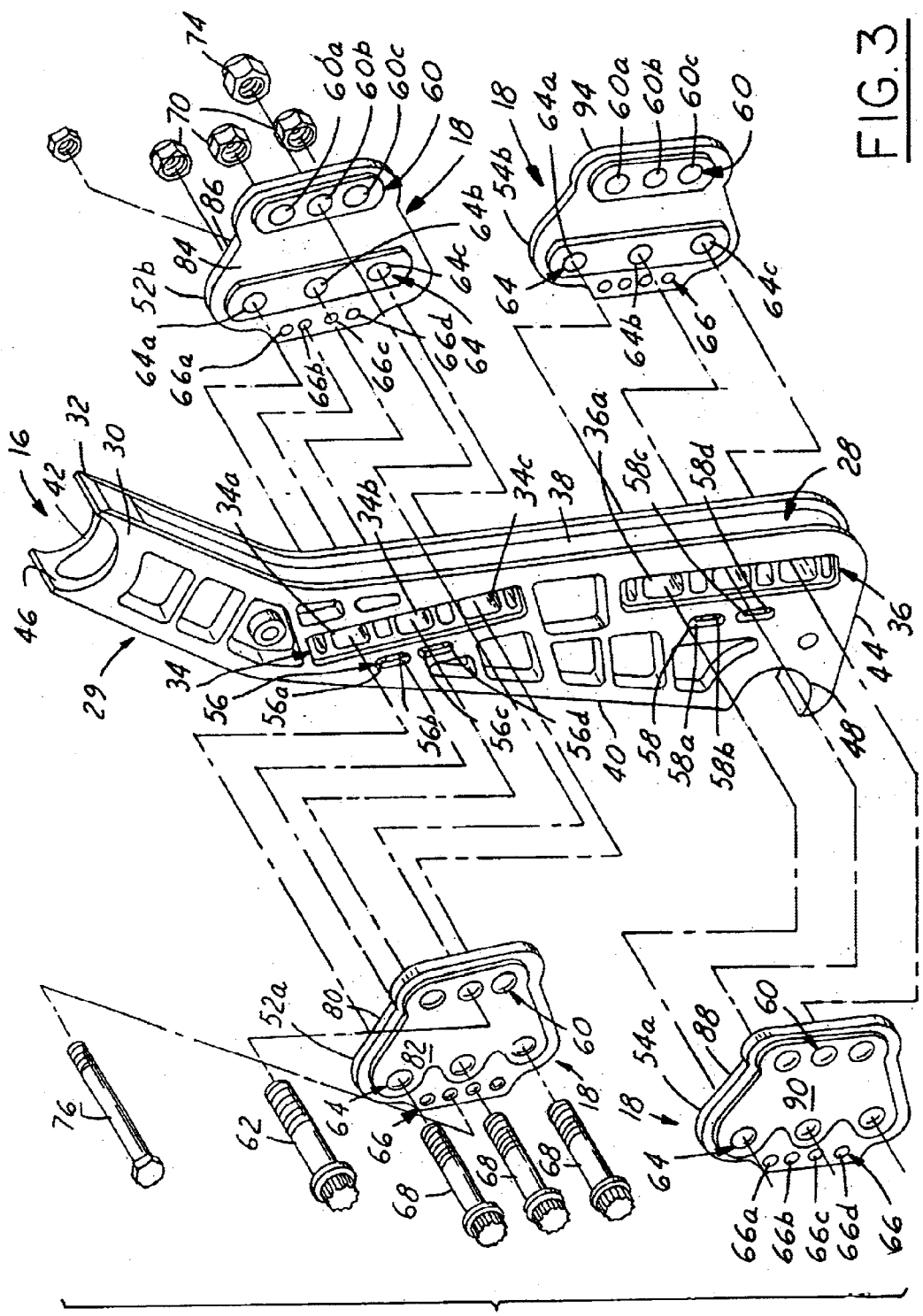
FIG. 3 is an exploded view of a main support bracket of a four-link suspension system in accordance with a preferred embodiment of the present invention.
Figure 4:
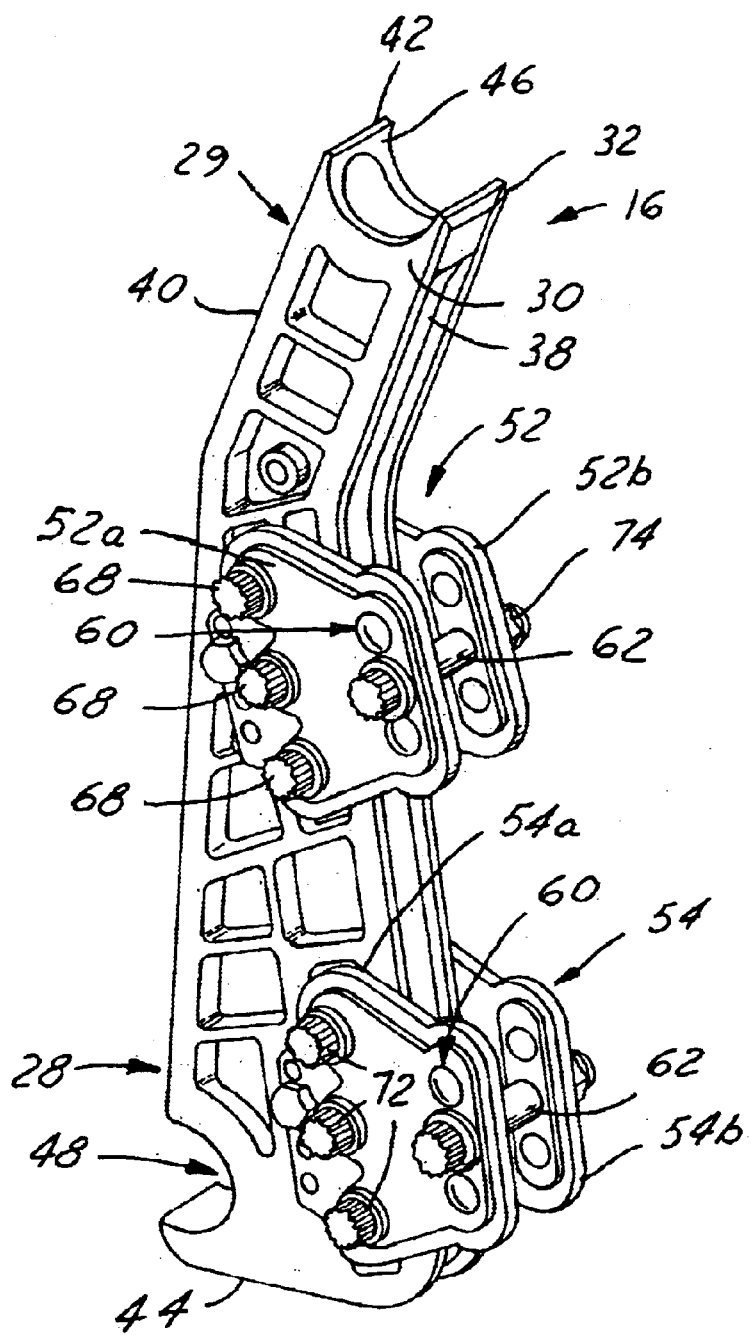
FIG. 4 is a perspective view of the main support bracket of FIG. 3 when assembled.

Referring now to FIGS. 3 and 4, which illustrate in more detail the preferred suspension system 12, including the main support bracket 16 and the plurality of individual links 18. The main support bracket 16 has a pair of opposing side portions 30, 32, a series of upper slots 34, a series of lower slots 36, a pair of opposing edge portions 38, 40, which extend between and connect the pair of opposing side portions 30, 32, a top portion 42 and a bottom portion 44. The series of upper slots 34 and the series of lower slots 36 are preferably formed through the main support bracket 1 6 such that they open on each of the pair of opposing side portions 30, 32. The main support bracket 16 has a lower portion 28 and an upper portion 29. The upper portion 29 is angled with respect to the lower portion 28 and the side portions 30, 32 become gradually narrower from the lower portion 28 to the upper portion 29.

Figure 6:
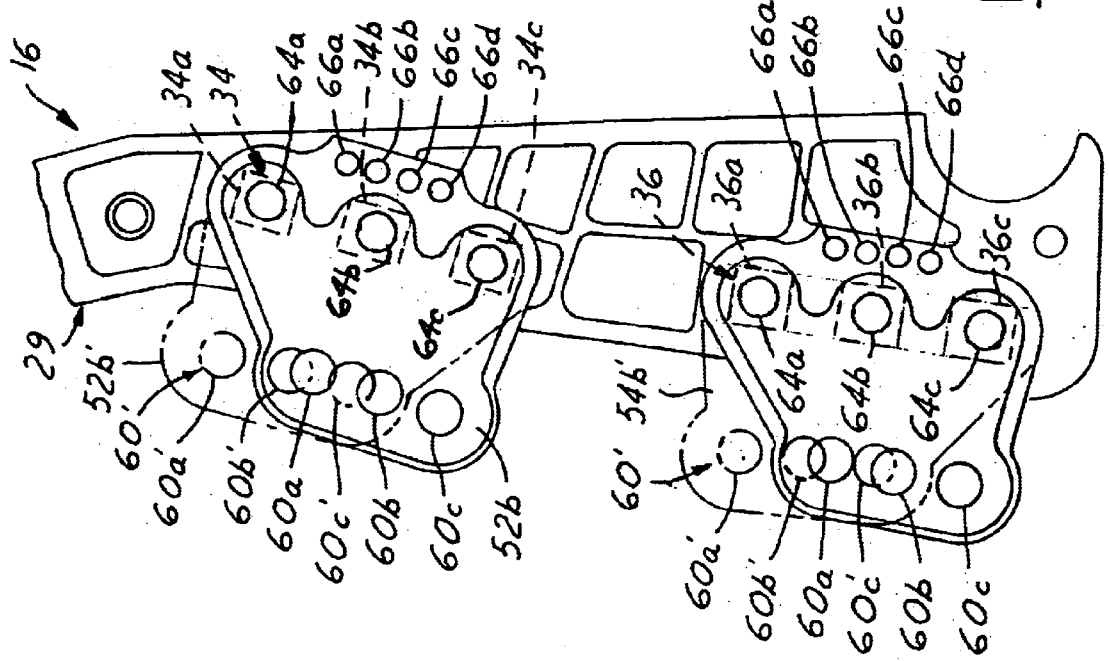
FIG. 6 is a schematic view of a pair of main support brackets mounted to a vehicle frame in accordance with a preferred embodiment of the present invention.

The main support bracket 16 also includes a pair of tubular frame-matching contours with a first contour 46 being formed in the top portion 42 of the support bracket 16 and the second contour 48 being formed in the second edge portion 40 adjacent to the bottom portion 44 of the support bracket 16. Each of the frame-matching contours 46, 48 is welded to a portion of a tubular frame 50, as shown in FIG. 6. It should be understood that the frame-matching contours 46, 48 may be located in a variety of other locations along the bracket 16, as may the series of slots 34 and 36. In accordance with the preferred embodiment, the main support bracket 16 is preferably subjected to heat treatment to 39RC (Rockwell hardness) to provide it with necessary strength. However, other levels of hardness are acceptable so long as they provide the necessary strength.

The upper series of slots 34 preferably contains three individual slots 34a, 34b, 34c. The lower series of slots 36 preferably contains three individual slots 36a, 36b, 36c. The upper series of slots 34 and the lower series of slots 36 together allow flexibility in the mounting of the links 18 relative to the main support bracket 16, as discussed in more detail below. The links 18 of the four-link suspension system 12 preferably comprise four perfectly matching links comprised of a pair of upper links 52 and a pair of lower links 54. The pair of upper links 52 are intended to engage the upper series of slots 34 and the pair of lower links 54 are intended to engage the lower series of slots 36. The width of each of the slots 34a, b, c and 36a, b, c in the upper and lower series of slots 34, 36 in the main support bracket 16 is machined to match the diameter of a corresponding hole in each of the plurality of links 18. The main support bracket 16 also includes an upper series of adjustment holes 56 comprised of four individual adjustment holes 56a, 56b, 56c, and 56d. The main support bracket 16 also includes a lower series of adjustment holes 58, which is comprised of four adjustment holes 58a, 58b, 58c, 58d. The slots 34, 36 and the adjustment holes 56, 58 can include any number of individual holes in a variety of different configurations.

The pair of upper links 52 and the pair of lower links 54 together preferably comprise four perfectly matching links 18. The pair of upper links 52 includes a first upper link 52a, which is intended to contact the first opposing side 30 of a mounting bracket 16 and a second upper link 52b, which is intended to engage the second opposing side portion 32 of the mounting bracket 16. The first upper link 52a has a first surface 80 and a second surface 82. The second upper link 52b has a first surface 84 and a second surface 86. The pair of lower links 54 includes a first lower link 54a, which is intended to engage the first opposing side portion 30 of the main support bracket 16 and a second lower link 54b, which is intended to engage the second opposing side portion 32 of the main support bracket 16. The first lower link has a first surface 88 and a second surface 90, while the second lower links has a first surface 92 and a second surface 94.

Each of the links 52a, 52b, 54a, 54b, includes three parallel series of holes formed therethrough. The first series of link holes 60 is the tie rod adjustment holes and includes three individual holes 60a, b, c formed through each link 52a, 52b, 54a, 54b with one of the holes 60a, 60b, 60c, of the first series of link holes 60 intended to receive a tie rod end threaded fastener 62 therethrough. The second series of link holes 64 also preferably comprises three holes 64a, 64b, 64c, which are intended to engage one of individual slots in either the upper series of slots 34 or the lower series of slots 36. The third series of link holes 66 includes four holes 66a, 66b, 66c, 66d with these holes being alignable with one of the holes in one of the sets of adjustment holes 56, 58.

FIG. 4 illustrates an exemplary attachment of each of the links 52a, 52b, 54a, 54b, to the main support bracket 16. As shown, the first surface 80 of the first upper link 52a is in contact with the first opposing side portion 30 and the first surface 84 of the second upper link 52b is contact with the second opposing side portion 32. The pair of upper links 52a and 52b are attached to the main support bracket 16 and to each other through the use of a plurality of upper main support threaded fasteners 68, which extend through a respective one (64a, 64b, 64c) of the second series of link holes 64 and through the series of upper slots 34. The slots 34 are configured such that they are larger than the second series of link holes 64 to provide further adjustments. Because the slots 34 are larger than the fasteners 68, the links 52a, 52b can be slid into a desired position for adjustment purposes prior to tightening of the nuts 70. The same applies to the adjustment of the lower links 54a, 54b. The upper main support fasteners 68 are then secured in place by a respective nut 70 or other known securing mechanism.

Similarly, the first surfaces 88, 92 of the lower links 54a, 54b are secured to the main support bracket 16 and to one another through a plurality of lower main support fasteners 72, which extend through the series of lower slots 36. The slots 36 are configured such that they are larger than the second series of link holes 64 to provide further adjustment through sliding. The lower main support fasteners 72 are also secured in place by a nut (not shown) or other known securing means to retain the links on the opposing sides of the main support bracket 16. The use of multiple fasteners keeps each of the pair of links securely attached to the bracket 16. However, more or less fasteners may be utilized as desired.

After the first and second upper links 52a and 52b are secured to the main support bracket 16 by one or more upper main support fasteners 68, the tie rod end threaded fastener 62 is then passed through an individual one 60a, 60b, or 60c of the first series of link holes 60 in the first upper link 52a such that it passes through a corresponding link hole 60a, 60b, 60c in the first series of link holes 60 in the second upper link 52b. Similarly, a tie rod end threaded fastener 62 is passed through an individual one of the first series of link holes 60 in the first lower link 54a and through a corresponding hole in the first series of link holes 60 in the second lower link 54b. Each of the tie rod end threaded fasteners 62 is secured in place by a respective nut 74 or other known securing mechanism.

An adjustment threaded fastener 76 is then passed through an individual one 66a, 66b, 66c, 66d of the third series of link holes 66 in the first upper links 52a such that it passes through a corresponding link hole 66a, 66b, 66c, 66d in the third series of link holes 66 in the second upper link 52b. Similarly, an adjustment threaded fastener 76 is also passed through an individual one 66a, 66b, 66c, 66d of the third series of link holes 66 in the first lower link 54a such that it passes through a corresponding link hole 66a, 66b, 66c, 66d in the third series of link holes 66 in the second lower link 52b. The passage of the adjustment threaded fasteners 76 through the pair of upper and lower links 52, 54 locks the upper links 52 or the lower links 54 in a certain position relative to the main support bracket 16.

By using a single adjustment threaded fastener 76, the pair of upper links 52 can be rotated and secured into an almost infinite number of positions, after the pair of upper links 52 have been secured within the series of upper slots 34. Further, at any set position for the pair of upper links 52, there exists a corresponding adjustment hole 66a, 66b, 66c, 66d in the third series of link holes 66. The series of adjustment holes 66 provides for added position and locking support for the pair of upper links 52. This is because by placing the threaded fastener 76 in one of the adjustment holes 66a, 66b, 66c, 66d, the links 52 can be slid or rotated us desired to provide further adjustment positions. In fact, an almost unlimited number of adjustment positions are therefore available.

The particular placement and combination of the holes in the main support bracket 16 and in each of the links 52a, 52b, the size of each hole and slot, the shape of each link, the shape of the main support bracket, and the engagement of the links 52a, 52b to the main support bracket 16, permit the four link suspension system 12 to have hundreds of possible instant center choices and locations. The pair of upper links are thus, almost infinitely adjustable with ⅛" increments thereby providing hundreds more (I/C) instant locations.

Similarly, the use of a single adjustment threaded fastener 76 allows the pair of lower links 54 to be almost infinitely adjusted within ⅛" increments. The pair of lower links 54 can be adjusted independently and without affecting the pair of upper links 52. At any set position for the pair of lower links 54, there exists a corresponding adjustment hole 66a, 66b, 66c, 66d in the third series of link holes 66. These holes along with another threaded fastener 76 provide for sliding adjustment of the lower links 54 similar as discussed above in connection with the upper links 52. The series of adjustment holes 66 provides for added position and locking support for the pair of lower links 54. The particular placement and combination of the holes in the main support bracket 16 and each hole in the links 54a, 54b, the size of each hole and slot, the shape of each link, the shape of the main support bracket, and the engagement of the links 54a, 54b to the main support bracket 16, permit the four-link suspension system 12 to have hundreds of possible instant center chassis and locations. Moreover, the pair of upper links 52a, 52b are interchangeable with the pair of lower links 54a, 54b.

Figure 5:
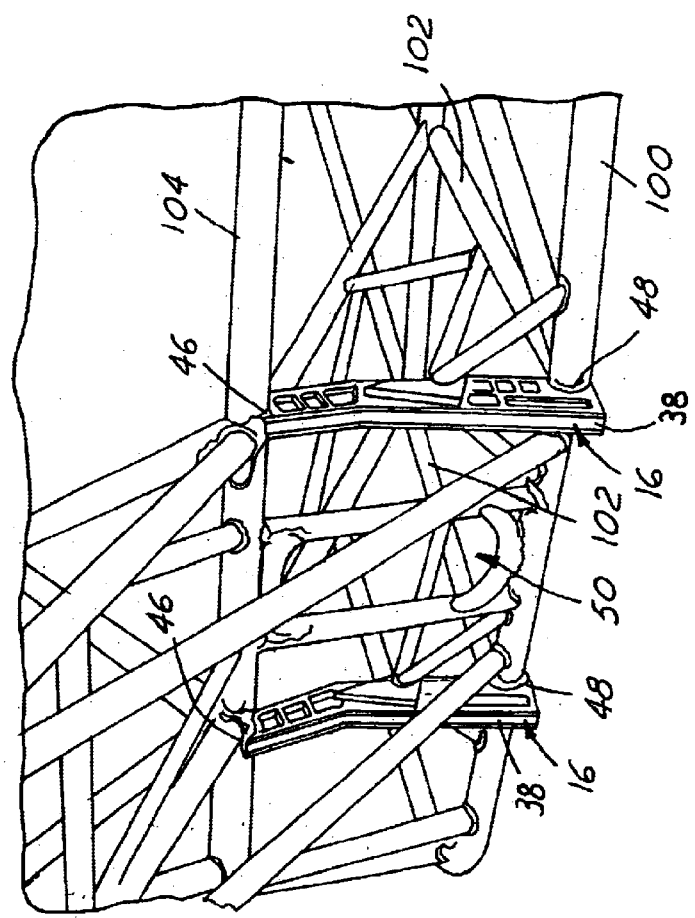
FIG. 5 is a side view of a main support bracket illustrating the adjustability of the links in accordance with a preferred embodiment of the present invention.

FIG. 5 illustrates a further adjustability feature of the present invention. As shown, each of the links 52a, 52b, 54a, 54b can be attached to the main support bracket 16 in both a regular and an inverted fashion. FIG. 5 illustrates an upper link 52b and a lower link 54b attached to the bracket 16 in a regular fashion, as discussed above. The upper link 52b' and the lower link 54b' are shown in phantom, attached to the bracket 16 in an inverted fashion. The ability to invert the links 52 and 54 allows for significantly increased flexibility by providing additional adjustment positions for each of the series of holes 60, 64, 66. This is illustrated by the locations of the first series of link holes 60 when the bracket is configured in its normal fashion and the location of the first series of link holes 60' (60a', 60b', 60c') when the bracket is inverted. It should be understood that the pair of upper links 52 can be attached to the main bracket 16 in an inverted fashion while the pair of lower links 54 can be attached to the main bracket 16 in a regular fashion. Similarly, the pair of upper links 52 can be attached to the main bracket 16 in a regular fashion while the pair of lower links 54 can be attached to the main bracket 16 in an inverted fashion. This ability provides added flexibility, versatility, and additional adjustment locations.

FIG. 6 illustrates the implementation of the present invention to the frame assembly 50 of a vehicle. As shown, a pair of mounting brackets 16 are preferably attached to the frame assembly 50. Each of the mounting brackets is attached to the main roll bar 100, which is welded to the second contour of each of the brackets 16. Further, a main frame rail 102 extends from the second edge 40 of each of the mounting brackets 16. Each of the mounting brackets 16 has a top roll bar tube 104 welded to the first contour 46 of each of the mounting brackets 16. The first edge 38 of each of the brackets 16 extends rearwardly to accept the links for adjustment of the rear wheels of the vehicle.

As is understood, each of the links is independently adjustable. Moreover, each of the links can be adjusted without affecting pinion angle, pre-load, or wheelbase change. A reconfiguration of the links in accordance with the present invention, permits the configuration of the four-link suspension system 12 to be changed in as little as three minutes as compared to the 15 to 20 minutes with prior configurations. The assortment of configurations available with the four-links suspension system 12 allows the user to have the ideal four-links suspension system for any particular application, as well as various weather and road conditions. Further, the disclosed four-link design allows different sized rod ends on the top and bottom links. Additionally, chassis ride height changes can be accomplished without changing instant center (I/C) locations.

In accordance with the present invention, one or more of the components of the four-link suspension system 12 are preferably produced from advanced manufacturing techniques and aerospace materials. These materials make the system lighter and stronger than prior current designs. Moreover, the disclosed system takes the guesswork out of tuning a rear suspension system and provides a scientific approach to racecar technology.

In order to determine the specific configuration of the four-links suspension system 12, it is necessary to configure a given vehicle for a particular environment based on certain methods of operation. Initially, a history of a particular vehicle may be created comprising four-link suspension configurations for any given environment. This recorded data may be in a hard copy format or entered into a computer. After past data is recorded, a lookup table may be created. This lookup table may be used either manually or may be transferred to a computer. This table, along with the knowledge of one skilled in the art, will provide an efficient method for determining an ideal suspension system configuration for a particular vehicle in a particular environment in accordance with the teachings disclosed herein.

What is claimed is:

1. An adjustable bracket assembly for a four-link suspension system which allows hundreds of different four-link suspension configurations thereby offering hundreds of different corresponding instant center locations, comprising:

at least one main support bracket containing a plurality of holes formed therethrough;

a first link containing a plurality of holes formed therethrough;

at least two of said plurality of holes formed within said first link are alignable with at least two of said plurality of holes formed within said at least one main support bracket; and a second link containing a plurality of holes formed therethrough;

at least two of said plurality of holes formed within said second link are alingable with at least two of said plurality of holes formed within said at least one main support bracket;

wherein said first link is engageable with said at least one main support bracket in both a normal inverted state and said second link is engageable with said at least one main support bracket in both a normal and inverted state;

whereby said first link is engageable in said inverted state with said at least one main racket to provide different locations for attachment of said four-link suspension system than are available when said first link is attached to said at least one main support bracket in said normal state;

whereby said second link is engageable in said inverted state with said at least one main support bracket to provide different locations for attachment of said four-link suspension system than are available when said second link is attached to said at least one main support bracket in said normal state.

2. The assembly as recited in claim 1, wherein at least one of said plurality of holes formed in at least one of said links is a rod end threaded fastener hole for receipt of a tie rod end threaded fastener therein.

3. The assembly as recited in claim 2, wherein at least one of said plurality of holes formed in at least one of said links is a main attachment hole for receipt of a threaded main attachment fastener therein to fasten said at least one link to said at least one main support bracket.

4. The assembly as recited in claim 3, wherein at least one of said plurality of holes formed in at least one of said links is an adjustment hole for receipt of an adjustment fastener therethrough for adjusting the position of said at least one link relative to the position of said at least one main support bracket.

5. The assembly as recited in claim 4, wherein said at least one main support bracket further comprises:

a plurality of holes for said adjustment fastener to extend through for adjusting the position of said at least one link relative to the position of said at least one main support bracket.

6. The assembly as recited in claim 3, wherein said at least one main support bracket further comprises:

a slot for receipt of said threaded main attachment fastener therethrough to provide a plurality of positions for fastening said at least one link to said at least one main support bracket.

7. The assembly as recited in claim 3, wherein said at least one main support bracket is heat treated to a Rockwell hardness of 37RC.

8. The assembly as recited in claim 2, wherein said at least one main support bracket further comprises:

a plurality of holes for a threaded adjustment fastener to extend through for adjusting the position of said at least one link relative to the position of said at least one main support bracket.

9. The assembly as recited in claim 1, wherein said at least one main support bracket further comprises at least one vehicle component contour matching support attachment area.

10. The assembly as recited in claim 9, wherein a contour of said at least one main support bracket matches a contour of said at least one vehicle component contour matching support attachment area.

11. An adjustable bracket assembly for a vehicle four-link suspension system comprising:

a main support bracket having a first side and a second side opposing said first side;

a first series of holes formed through said main support bracket and extending from said first side to said second side;

a first link having a first side and a second side, and one or more holes formed through said first link and extending through both said first side and said second side;

said one or more holes in said first link being alignable with one or more holes of said first series of holes when either said first side of said first link engages said main support bracket or said second side of said first link engages said main support bracket, whereby said first link can be vertically adjusted with respect to said main support bracket to allow for a multitude of different attachment points; and wherein said main support bracket further comprises a second series of holes that allow for adjustment of said first link.

12. The assembly as recited in claim 11, further comprising:

a second link having a first side and a second side, and one or more holes formed through said second link and extending through both said first side and said second side;

said one or more holes in said second link being alignable with one or more holes of said first series of holes when either said first side of said second link engages said main support bracket or said second side of said second link engages said main support bracket.

13. The assembly as recited in claim 12, further comprising:

an adjustment fastener passed through one of said one or more holes formed in said first link, a corresonding one of said one or more holes formed in said second link, and one of said second series of holes formed in said main support bracket.

14. The assembly as recited in claim 12, further comprising:
   a main threaded fastener passed through one of said one or more holes formed in said first link, a corresponding one of said one or more holes formed in said second link, and one of said first series of holes formed in said main support bracket to secure said first link and said second link to said main support bracket.

15. The assembly as recited in claim 11, wherein said main support bracket further comprises at least one vehicle component contour matching support attachment area.

16. The assembly as recited in claim 15, wherein said at least one vehicle component contour matching support attachment area matches a contour of a portion of a vehicle frame assembly.

17. A bracket assembly for adjusting a chassis of a high performance vehicle, comprising:
   a first main support bracket secured to a side of the vehicle chassis, said first main support bracket having a plurality of holes formed therethrough;
   a first upper link having a plurality of holes formed therethrough, at least two of said plurality of holes formed in said first upper link being alignable with at least two of said plurality of holes formed in said first main support bracket;
   a first lower link having a plurality of holes formed therethrough, at least two of said plurality of holes formed in said first lower link being alignable with at least two of said plurality of holes formed in said first main support bracket;
   a second main support bracket secured to an opposing side of the vehicle chassis, said second main support bracket having a plurality of holes formed therethrough;
   a second upper link having a plurality of holes formed therethrough, at least two of said plurality of holes formed in said second upper link being alignable with at least two of said plurality of holes formed in said second main support bracket;
   a second lower link having a plurality of holes formed therethrough, at least two of said plurality of holes formed in said second lower link being alignable with at least two of said plurality of holes formed in said second main support bracket;
   wherein each of said links is engageable with its respective main support bracket in both a normal and an inverted state to provide a multitude of attachment points to vary a height of the vehicle chassis as desired.

* * * * *

UNITED STATES PATENT AND TRADEMARK OFFICE
CERTIFICATE OF CORRECTION

PATENT NO. : 6,698,775 B2  
DATED : March 2, 2004  
INVENTOR(S) : Donald S. Ness It is certified that error appears in the above-identified patent and that said Letters Patent is hereby corrected as shown below:

Column 7,  
Line 33, please replace to read as follows:  
-- main support bracket in both a normal and inverted state --  
Line 38, please replace to read as follows:  
-- with said at least one main support bracket to provide different --

Signed and Sealed this

Twenty-fifth Day of May, 2004

JON W. DUDAS  
*Acting Director of the United States Patent and Trademark Office*